United States Patent [19]
Liu

[11] Patent Number: 5,715,346
[45] Date of Patent: Feb. 3, 1998

[54] LARGE EFFECTIVE AREA SINGLE MODE OPTICAL WAVEGUIDE

[75] Inventor: Yanming Liu, Horseheads, N.Y.

[73] Assignee: Corning Incorporated

[21] Appl. No.: 573,472

[22] Filed: Dec. 15, 1995

[51] Int. Cl.$^6$ .................................................. G02B 6/18
[52] U.S. Cl. ........................................................ 385/124
[58] Field of Search ................................. 385/123–128

[56] References Cited

U.S. PATENT DOCUMENTS

| | | | |
|---|---|---|---|
| 4,473,273 | 9/1984 | Hodge | 385/124 |
| 4,715,679 | 12/1987 | Bhagavatula | 385/124 |
| 5,013,131 | 5/1991 | Fotheringham | 385/124 |
| 5,123,076 | 6/1992 | Nishimoto et al. | 385/124 |

FOREIGN PATENT DOCUMENTS 3-242343 of 1991 Japan.

OTHER PUBLICATIONS

Single Mode Fiber Optics, Marc DeKKer Inc. Luc B. Jean Homme, 1990, p. 32, section 1.3.2., no month aval.

*Primary Examiner*—Brian Healy
*Assistant Examiner*—Hemang Sunghavi
*Attorney, Agent, or Firm*—William Chervenak

[57] ABSTRACT

Disclosed is a single mode optical waveguide fiber which limits nonlinear effects at both the 1300 nm window and the 1550 nm window of operations. Examples of core region refractive index profiles which yield the required properties are a modified step index profile and profiles which have a maximum Δ% which is spaced apart from the centerline of the waveguide fiber.

7 Claims, 4 Drawing Sheets

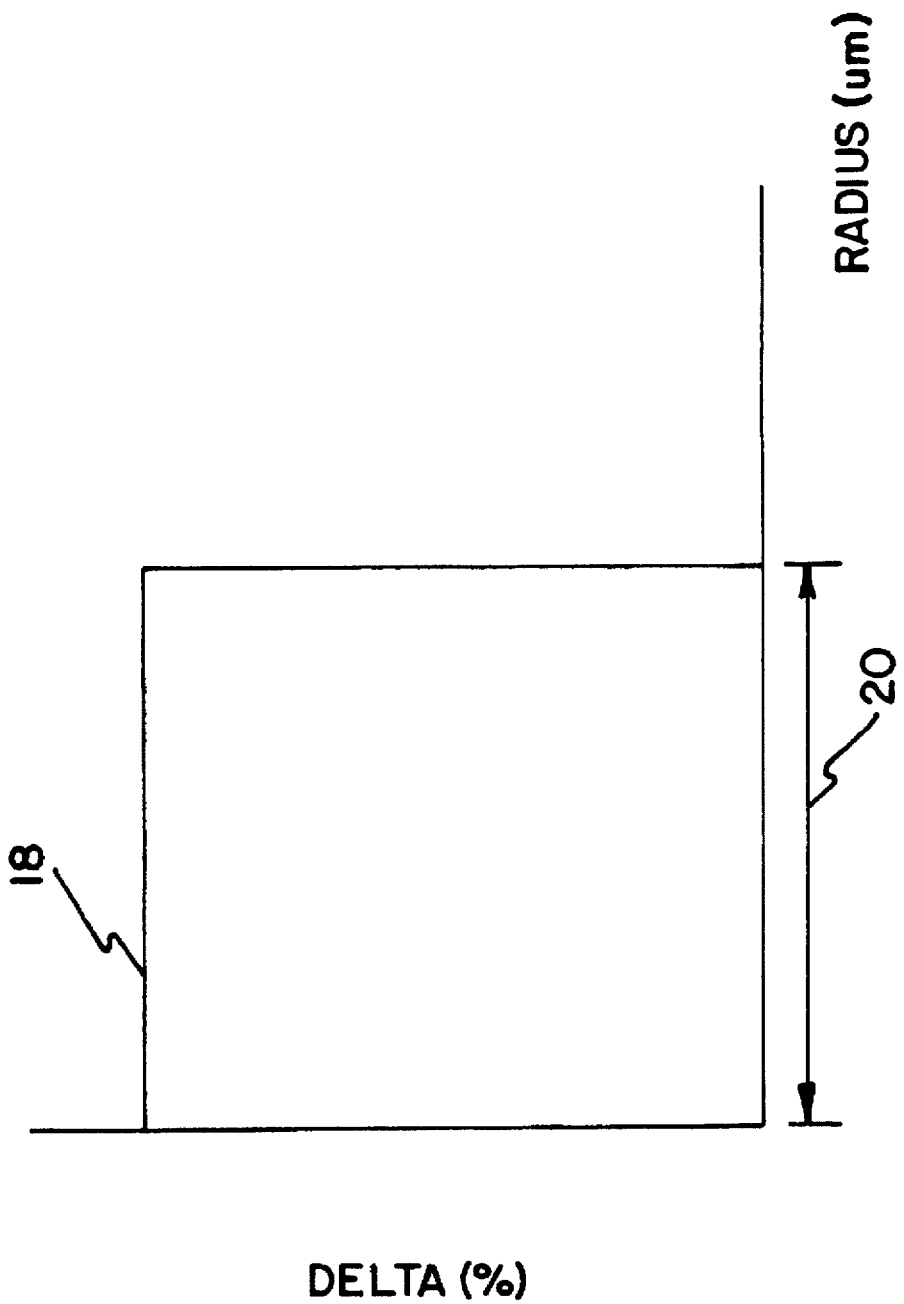

LARGE EFFECTIVE AREA SINGLE MODE OPTICAL WAVEGUIDE

BACKGROUND OF THE INVENTION

The invention relates to a single mode optical waveguide fiber for communications applications having a large effective area, $A_{eff}$. In particular, the invention is a single mode optical waveguide fiber having large effective area at both the 1300 nm and 1550 nm operating window.

A single mode waveguide, having a large effective area, will have reduced non-linear optical effects, including self phase modulation, four wave mixing, cross phase modulation, and non-linear scattering processes. In the case of four wave mixing, the placement of the zero dispersion wavelength is also important. Each of these effects causes degradation of signal in high power systems.

The scattering processes, which degrade signal, are in general described by an equation containing a term, $\exp(cP/A_{eff})$, where c is a constant P is signal power. The other non-linear effects are described by equations which include the ratio, $P/A_{eff}$ as a multiplier. Thus, an increase in $A_{eff}$ produces a decrease in the non-linear contribution to the degradation of a light signal.

The requirement in the communication industry for greater information capacity over long distances, without regenerators, has led to a reevaluation of single mode fiber index profile design.

The focus of this reevaluation has been to provide optical waveguides which:

reduce non-linear effects such as those noted above;

are compatible with optical amplifiers; and, retain the desirable properties of optical waveguides such as low attenuation, high strength, fatigue resistance, and bend resistance. This work has been focussed on wavelengths ranges which include the operating window at 1550 nm. However, because many reliable devices, including lasers, optical amplifiers, receivers, transmitters and regenerators, have been designed for use around 1300 nm, there is an additional need to reduce nonlinear effects at this shorter operating wavelength.

Thus there is a need for a single mode optical waveguide fiber which has large effective area at the operating wavelength windows, near 1300 nm and 1550 nm, respectively.

Previous studies, such as that disclosed in U.S. patent application Ser. No. 08/378,780, incorporate some of the basic concepts of segmented core design first introduced in U.S. Pat. No. 4,715,679, Bhagavatula. Larger effective area waveguides were discovered for a class of core designs disclosed in the application Ser. No. 08/378,780 cited above. A particular design incorporating at least one core region having a minimum index below that of the clad was disclosed in that application.

In addition, in U.S. patent application Ser. No. 08/287,262, discloses particular features of a family of index profiles having a refractive index maximum spaced apart from the centerline of the waveguide fiber.

The novel refractive index profiles, disclosed and described herein, are yet another sub-species of the '679 Bhagavatula patent. The basic segmented core concept has proven sufficiently flexible to provide the novel core structures of this application, which are tailored to limit nonlinear effects at both the 1300 nm and the 1550 nm operating window.

Definitions

The effective area is $A_{eff} = 2\pi (\int E^2 \, r \, dr)^2 / (\int E^4 \, r \, dr)$, where the integration limits are 0 to $\infty$, and E is the electric field associated with the propagated light.

An effective diameter, $D_{eff}$, may be defined as, $$D_{eff} = 2(A_{eff}/\pi)^{1/2}$$

The mode field area $A_{mf}$ is $\pi(D_{mf}/2)^2$, where $D_{mf}$ is the mode field diameter measured using the Peterman II method wherein, $2w = D_{mf}$ and $w^2 = (2\int E^2 \, r \, dr/\int [dE/dr]^2 \, r \, dr)$, the integral limits being 0 to infinity.

The width of an index profile segment is the distance between two vertical lines drawn from the respective beginning and ending points of the index profile to the horizontal axis of the chart of refractive index vs. radius.

The % index delta is

% $\Delta = [(n_1^2 - n_c^2)/2n_1^2] \times 100$, where $n_1$ is a core index and $n_c$ is the clad index. Unless otherwise stated, $n_1$ is the maximum refractive index in the core region characterized by a % $\Delta$.

A refractive index profile in general has an associated effective refractive index profile which is different in shape. An effective refractive index profile may be substituted, for its associated refractive index profile, without altering the waveguide performance. See reference, *Single Mode Fiber Optics*, Marcel Dekker Inc., Luc B. Jeunhomme, 1990, page 32, section 1.3.2.

Bend performance is defined by a standard testing procedure in which the attenuation induced by winding a waveguide fiber about a mandrel is measured. The standard test calls for waveguide fiber performance having a bend of one turn about a 32 mm mandrel and having bends of 100 turns about a 75 mm mandrel. The maximum allowed bending induced attenuation is usually specified in the operating window around 1300 nm and around 1550 nm.

An alternative bend test is the pin array bend test which is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

A point minimum refers to a portion of a refractive index profile, which has a 'V' shape or a narrow 'U' shape. The point minimum is the lowest index value of the refractive index profile portion.

An extended minimum refers to a portion of a refractive index profile which has a broad 'U' or 'L' shape. The extended minimum is the line traversing the lowest values of the refractive index profile portion.

SUMMARY OF THE INVENTION

A first aspect of the invention is a single mode optical waveguide fiber having a core refractive index profile whose maximum refractive index is spaced apart from the long axis centerline of the waveguide. The refractive index profile has a point minimum near the centerline of the waveguide and is symmetrical about the centerline. A clad layer surrounds the core to complete the waveguide structure. At least a portion of the core index profile is greater than the maximum clad refractive index, to ensure that the structure will properly guide a light signal.

In an embodiment of this first aspect, the index profile portion between the point minimum and the refractive index maximum is a continuous curve. In a preferred embodiment, the continuous curve is monotone. Techniques to compensate for center diffusion of dopant out of a preform, such as adjusting doping level in the deposition step or by control of the soot blank environment in the consolidation step, are known in the art.

The parameters of the family of waveguide profiles defined in this first aspect are:

core radius in the range of about 4 to 7 microns;

maximum $\Delta\%$ in the range of about 0.3% to 0.55%; and, point minimum $\Delta\%$ less than about 0.20%.

This family of waveguides has the properties:

$\lambda_o$ near 1300 nm;

$A_{eff}$>90 microns$^2$ at 1300 nm; and, $D_{eff}$>MFD over a wavelength range of about 1530 nm to 1565 nm.

A second aspect of the invention is a single mode optical waveguide fiber having a first and a second segment disposed symmetrically about the waveguide centerline. The extent of each segment is defined by a radius from the centerline to the last segment point. A $\Delta\%$ is associated with each segment. A clad layer surrounds the core and has a maximum refractive index $n_c$. At least a portion of the refractive index profiles of one of the segments is greater than $n_c$. At least one of the segments has an extended minimum. This family of novel refractive index profiles provides a waveguide fiber having $A_{eff}$ at 1300 nm greater than about 90 microns$^2$, and at 1550 nm greater than about 110 microns$^2$. The $\lambda_o$ is near 1300 nm.

A preferred embodiment of this second aspect of the novel refractive index profile is one in which the first core segment is essentially constant and has a refractive index $n_1$. The second segment has a maximum refractive index $n_2$, where $n_2$>$n_1$.

In a most preferred embodiment of this second aspect of the invention, the second segment refractive index profile is trapezoidal. The outside radius of the first segment, having a substantially constant refractive index, is in the range of about 1.5 microns to 1.9 microns, and $n_1$ is essentially equal to $n_c$. The outside radius of the second core segment is in the range of 3.8 microns to 5 microns. This second segment has a refractive index difference, $\Delta_2\%$, in the range of about 0.25% to 0.45%.

A third aspect of the novel profile is a single mode optical waveguide fiber, having a step index profile of refractive index $n_o$, a refractive index difference, $\Delta_1\%$, and a radius $r_1$. The maximum refractive index of the surrounding clad layer is $n_c$, where $n_o$>$n_c$. The refractive index difference, $\Delta_1\%$ is in the range of about 0.25% to 0.35% and $r_1$ is in the range of about 5.5 microns to 6 microns. The $A_{eff}$ at 1300 nm and 1550 nm is 90 microns$_2$ and 110 microns$^2$, respectively. The $\lambda_o$ is near 1300 nm.

BRIEF DESCRIPTION OF THE DRAWINGS

FIG. 4 is a step index embodiment of the novel refractive index profile.

DETAILED DESCRIPTION OF THE INVENTION

Advantages of having two operating windows, i.e., two signal wavelength ranges separated by a few hundred nanometers, are:

a system can be operated at only one window until rate demands justify investing in a second window of operation;

a second window can act as a redundant system for those telecommunications links requiring essentially failure free operation; and, a second window can handle overflow from a primary window in systems where there is a large data rate difference between peak demand and average demand.

The present invention provides a dual window waveguide fiber having the extra feature that non-linear effects, which can arise in high power density systems, wavelength division multiplex systems, or systems incorporating optical amplifiers, are minimized. The novel waveguide fibers of this application have high effective area in both the 1300 nm and 1550 nm windows.

Figure 1:
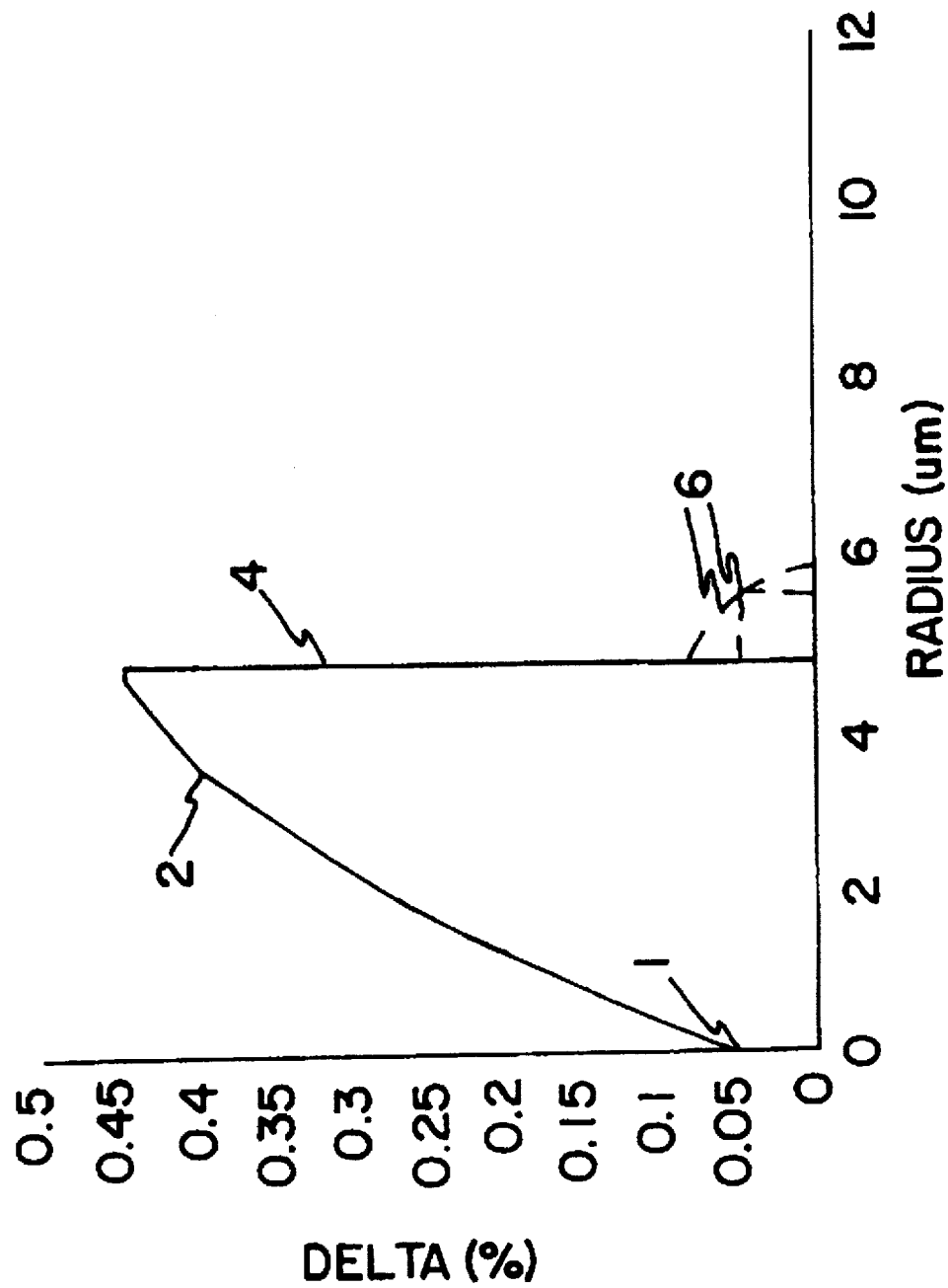
FIG. 1 is an illustrative chart showing a refractive index profile having a point minimum.
Figure 2:
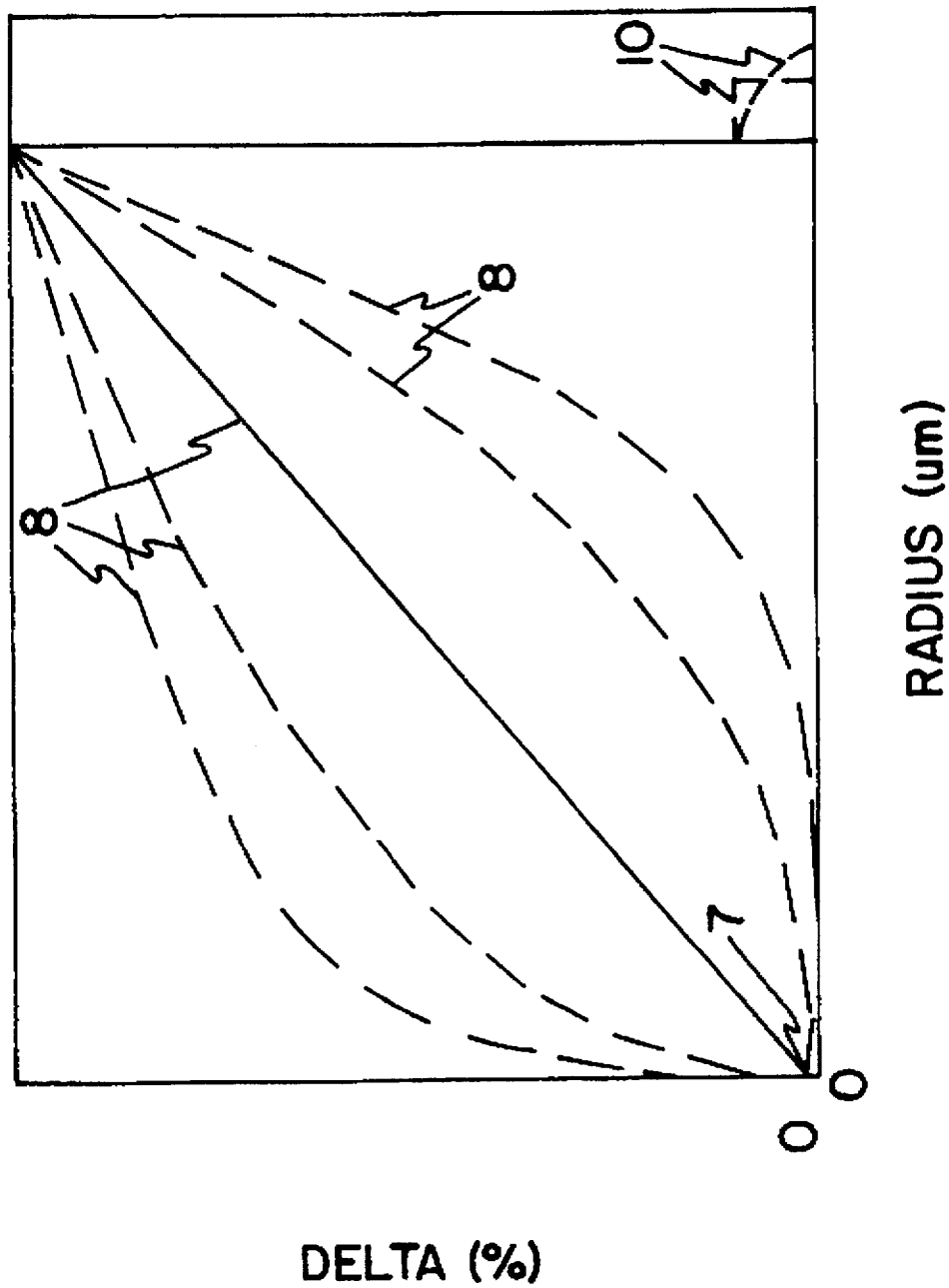
FIG. 2 is an illustrative chart showing alternative refractive index profiles having a point minimum.

A first embodiment of the novel waveguide core profile is illustrated in FIG. 1. The refractive index difference, 1, near the centerline is small, typically less than about 0.20%. The dopant level increases with radius, as indicated by curve 2 until a maximum $\Delta\%$ is reached. The final portion of the index profile, 4, shows $\Delta\%$ dropping off sharply to zero. There are several equivalent index profiles wherein curve 4 can be altered without significantly affecting the waveguide fiber properties. For example, 4 may be tilted outward to increase the radius by about a micron or the junction of curves 4 and 2 may be rounded. Also small additions to the refractive index profile, such as those indicated by curves 6, may be made without significant impact on waveguide fiber properties. Thus it will be understood that FIG. 1 together with FIG. 2 represent a family of refractive index profiles which provide large effective area at 1300 nm. Curves 8 of FIG. 2 show several members of the novel index profile family. Again, curves 10 indicate the types of variations of the invented index profile which still provide the required waveguide fiber properties.

An added benefit of the index profiles of FIGS. 1 and 2, is that the integrated dopant is lower as compared to a standard step index profile. Hence the attenuation, which depends upon the dopant amount, will be lower in the novel waveguide fiber.

EXAMPLE 1

Properties of a Point Minimum Waveguide

For the refractive index profiles shown by the solid curve in FIG. 1, the following properties are calculated from the computer model:

$\lambda_o$ is 1298 nm;

Mode Field Diameter is 10.91 microns;

$D_{eff}$ is 11.22 microns;

$A_{eff}$ is 98.9 microns$^2$;

Cut off wavelength is 1480 nm; and,

Integrated GeO$_2$ is 2.58.

Note that $D_{eff}$ is larger that mode field diameter and that $A_{eff}$ is nearly about 25% higher than that of standard step index fiber.

For comparison, a step index fiber having the radius shown in FIG. 1, and a Δ% of 0.36%, has properties:

$\lambda_o$ is 1309 nm;

Mode Field Diameter is 10.1 microns;

$D_{eff}$ is 9.97 microns;

$A_{eff}$ is 78 microns$^2$;

Cut off wavelength is 1324 nm; and,

Integrated GeO$_2$ is 2.8. The effective area is much lower and the dispersion zero, $\lambda_o$, is in the operating window, a characteristic unfavorable for wavelength division multiplexed systems. The 9% increase in integrated GeO$_2$ for the standard step index profile will result in higher waveguide attenuation due to Rayleigh scattering. Both the larger effective area and the lower attenuation of the novel waveguide fiber refractive index profile serve to reduce adverse nonlinear effects.

The standard step index profile can be modified in a simple way to achieve large effective area. The profile may be characterized by Δ% of the step, 18 in FIG. 4, and the radius 20. Table 1 shows the effect of Δ% changes and radius changes on the effective area and the pin array bend resistance.

TABLE 1

| Δ% | Radius microns | $A_{eff}$ @ 1300 microns$^2$ | $A_{eff}$ @ 1550 microns$^2$ | Pin Array @ 1550 dB |
|---|---|---|---|---|
| 0.36 | 4.5 | 67 | 83 | 6.9 |
| 0.315 | 5.0 | 77 | 96 | 12.2 |
| 0.293 | 5.63 | 90 | 110 | 9.8 |
| 0.278 | 5.88 | 96 | 117 | 12.2 |

The trade off of bend resistance for larger effective area is clear. Lowering the Δ% and increasing the radius clearly provides the required larger effective areas. The step design having Δ% near 0.3% and radius near 5.6 microns has an acceptable bend resistance with significant improvement in $A_{eff}$.

A trapezoidal index profile spaced apart from the waveguide centerline allows additional flexibility in the refractive index profile design to achieve acceptable bend performance along with large effective areas at both wavelength windows.

Figure 3:
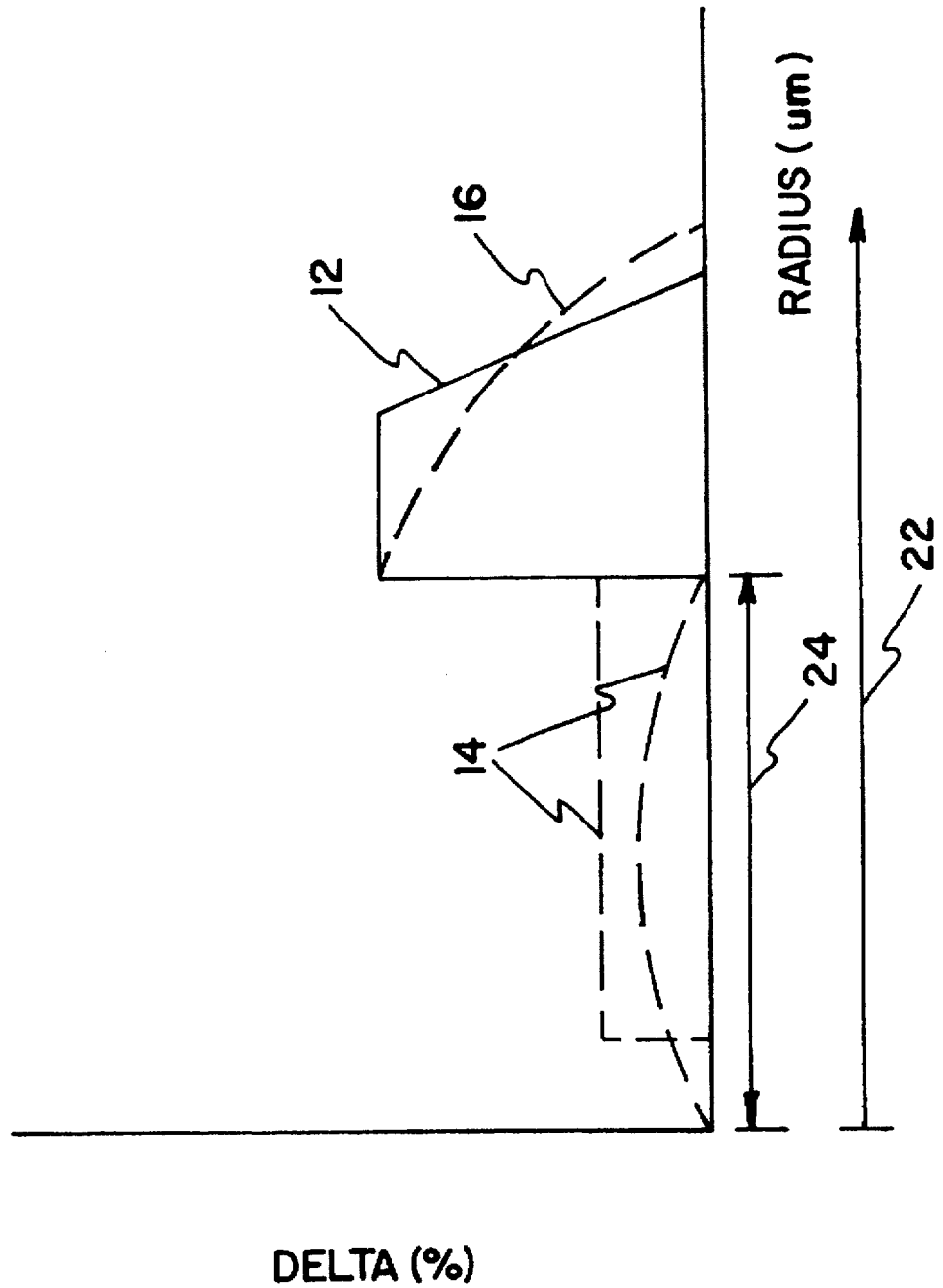
FIG. 3 is an illustrative chart showing an off axis trapezoidal ring index profile and alternatives.

The general shape of this embodiment of the novel waveguide fiber is illustrated in FIG. 3. The trapezoidal shape 12 is spaced apart from the waveguide centerline. The inside and outside radii of the trapezoidal core index profile segment are 24 and 22 respectively. The refractive index profile of the core segment adjacent the waveguide centerline may be substantially flat or may have a shape as illustrated by curves 14. The required properties of the novel waveguide may be obtained using slight variations of the trapezoidal shape, as shown by curve 16 or by finding equivalent refractive index profiles.

Table 2 provides modelled values for the trapezoidal embodiment of the novel waveguide fiber. Under the column heading, 'Radii', the first number is the inside radius of the trapezoid and the second number is the outside radius thereof.

TABLE 2

| Δ% | Radii microns | $A_{eff}$ @ 1330 microns$^2$ | $A_{eff}$ @ 1550 microns$^2$ | Pin Array @ 1550 dB |
|---|---|---|---|---|
| 0.367 | 1.7–4.5 | 94 | 110 | 9.8 |
| 0.337 | 1.78–4.98 | 104 | 120 | 14.4 |
| 0.320 | 1.85–5.23 | 112 | 130 | 14.2 |
| 0.344 | 1.7–3.91 | 104 | 120 | 9.5 |

Excellent characteristics are shown by the profile designs of rows 1 and 4. These embodiments meet the requirements for an optical waveguide fiber which limits nonlinear effects while retaining the needed bend resistance.

Tables 1 and 2 show that a computer model is essential for efficiently identifying the refractive index profiles which meet a given set of performance requirements. Comparing the distinct index profile designs, as given in the rows of the tables, illustrates that small changes in index profile parameters can have a large impact on waveguide properties. Thus, the number of combinations and permutations which must be tried favor an approach wherein computer modelling precedes manufacture of the waveguide fiber.

Although particular embodiments of the invention have herein been disclosed and described, the invention is nonetheless limited only by the following claims.

What is claimed is:

1. A single mode optical waveguide fiber comprising:

a core region, having a centerline along the long axis of the waveguide fiber and a radius, said core region having a refractive index profile and a maximum refractive index; and, a clad layer surrounding said core region, said clad layer having an index profile and a maximum refractive index $n_c$;

wherein at least a portion of said core region refractive index profile has a refractive index greater than $n_c$, said core region characterized in that the maximum refractive index is spaced apart from the centerline, a point minimum of said refractive index profile is positioned near the centerline, and the centerline is an axis of symmetry of the refractive index profile; wherein, said core region radius is in the range of about 4 to 7 microns, the maximum refractive index difference, $\Delta_1$ of said core region is in the range of about 0.35% to 0.55%, and the refractive index difference, $\Delta_2$ of the point minimum near the centerline is less than about 0.20%.

2. A single mode optical waveguide fiber comprising:

a core region, having a centerline along the long axis of the waveguide fiber and a radius, said core region having a refractive index profile and a maximum refractive index; and, a clad layer surrounding said core region, said clad layer having an index profile and a maximum refractive index $n_c$;

wherein at least a portion of said core region refractive index profile has a refractive index greater than $n_c$, said core region characterized in that the maximum refractive index is spaced apart from the centerline, a point minimum of said refractive index profile is positioned near the centerline, and the centerline is an axis of symmetry of the refractive index profile; wherein zero dispersion wavelength, $\lambda_o$, is near 1300 nm, effective area, $A_{eff} \geq 90$ microns$^2$ at 1300 nm, and effective diameter, $D_{eff} \geq MFD$, mode field diameter, over the wavelength range of 1530 nm to 1565 nm.

3. A single mode optical waveguide fiber comprising:

a core region, having a centerline, and including a first and a second segment, each said segment having a refractive index profile, an outside radius, and a refractive index difference, Δ%, said first segment including the centerline and said second segment surrounding said first segment, said first and second segments having the centerline as an axis of symmetry;

a clad layer surrounding said core region, said dad layer having a refractive index profile and a maximum refractive index $n_c$;

wherein at least a portion of the refractive index profile of at least one of said segments has a refractive index greater than $n_c$;

said core region characterized in that at least a portion of the refractive index profile of one of said first and second segments has an extended minimum;

said waveguide fiber characterized by effective area, $A_{\it eff}$ greater than about 90 microns$^2$ at 1300 nm and effective area, $A_{\it eff}$ greater than about 110 microns$^2$ at 1550 nm.

4. The single mode optical waveguide fiber of claim 3 wherein said first segement of said core region has a substantially constant refractive index $n_1$, said second segment has a maximum refractive index $n_2$, and $n_2 > n_1$.

5. The single mode optical waveguide fiber pf claim 4 wherein the index profile of said second segment is trapezoidal.

6. The single mode fiber of claim 5 wherein the outside radius of said first core region segment is in the range of 1.5 microns to 1.9 microns, $n_1$ is substantially equal to $n_c$, the outside radius of said second core region segment is in the range of about 3.8 microns to 5 microns, and the refractive index difference of said second segment, Δ%, is in the range 0.25% to 0.45 %.

7. A single mode optical waveguide fiber comprising:

a core region having a step index profile of refractive index $n_o$, a refractive index difference $\Delta_1\%$ and a radius $r_1$;

a clad layer surrounding said core, having a maximum refractive index $n_c$, $n_o > n_c$;

wherein $\Delta_1\%$ is in the range of about 0.25% to 0.30% and $r_1$ is in the range of about 5.5 microns to 6 microns, and effective area, $A_{\it eff}$ at 1300 nm is greater than about 90 microns$^2$ and effective area, $A_{\it eff}$ at 1550 microns$^2$ is greater than about 110 microns$^2$.

\* \* \* \* \*

UNITED STATES PATENT AND TRADEMARK OFFICE
CERTIFICATE OF CORRECTION

PATENT NO. : 5,715,346
DATED : March 3, 1998
INVENTOR(S) : Yanming Liu

It is certified that error appears in the above-identified patent and that said Letters Patent is hereby corrected as shown below:

Column 7,
Line 23, "segement" should be --segment--.

Column 8,
Line 1, "pf" should be --of--.
Line 14, "$n_c$" should be --$n_o$--.
Line 23, "microns$^2$" should be --nm--.

Signed and Sealed this

Nineteenth Day of June, 2001

*Attest:*

NICHOLAS P. GODICI
*Attesting Officer*    *Acting Director of the United States Patent and Trademark Office*